United States Patent [19]
Han et al.

[11] Patent Number: 5,234,875
[45] Date of Patent: Aug. 10, 1993

[54] COKE-SELECTIVATED POROUS ACIDIC CRYSTALLINE CATALYST, ITS PREPARATION, AND USE IN OLEFIN OLIGOMERIZATION

[75] Inventors: Scott Han, Lawrenceville; Roland H. Heck, Pennington; Frank T. DiGuiseppi, Yardville, all of N.J.

[73] Assignee: Mobil Oil Corporation, Fairfax, Va.

[21] Appl. No.: 805,137

[22] Filed: Dec. 11, 1991

[51] Int. Cl.$^5$ .............................................. B01J 29/06
[52] U.S. Cl. ........................................ 502/77; 502/64; 585/533
[58] Field of Search .................... 502/64, 71, 77; 585/312, 313, 651, 653, 533

[56] References Cited

U.S. PATENT DOCUMENTS

| | | | |
|---|---|---|---|
| 4,001,346 | 1/1977 | Chu | 260/671 |
| 4,104,151 | 8/1978 | Rubin et al. | 585/653 |
| 4,128,592 | 12/1978 | Kaeding | 260/671 |
| 4,358,395 | 11/1982 | Haag et al. | 585/488 |
| 4,520,221 | 5/1985 | Hsia Chen | 585/517 |
| 4,547,613 | 10/1985 | Garwood et al. | 585/533 |
| 4,568,786 | 2/1986 | Hsia Chen et al. | 585/517 |
| 4,638,106 | 1/1987 | Pieters et al. | 585/640 |
| 4,683,052 | 7/1987 | Degnan, Jr. et al. | 208/111 |
| 4,870,038 | 9/1989 | Page et al. | 502/62 |
| 5,043,522 | 8/1991 | Leyshon et al. | 585/651 |
| 5,080,878 | 1/1992 | Bowes et al. | 585/643 |

*Primary Examiner*—Anthony McFarlane
*Attorney, Agent, or Firm*—Alexander J. McKillop; Dennis P. Santini; Laurence P. Hobbes

[57] ABSTRACT

A surface-inactivated catalyst composition comprising acidic porous crystalline material, e.g., ZSM-23, having active internal Brönsted acid sites and containing coke-inactivated external acid sites is prepared by contacting the catalyst under high pressure coking conditions, e.g. 800 psig. The catalyst may be used for organic compound conversion, e.g., oligomerization of lower olefins to produce distillate boiling range materials having reduced methyl branching and increased cetane number.

10 Claims, 1 Drawing Sheet

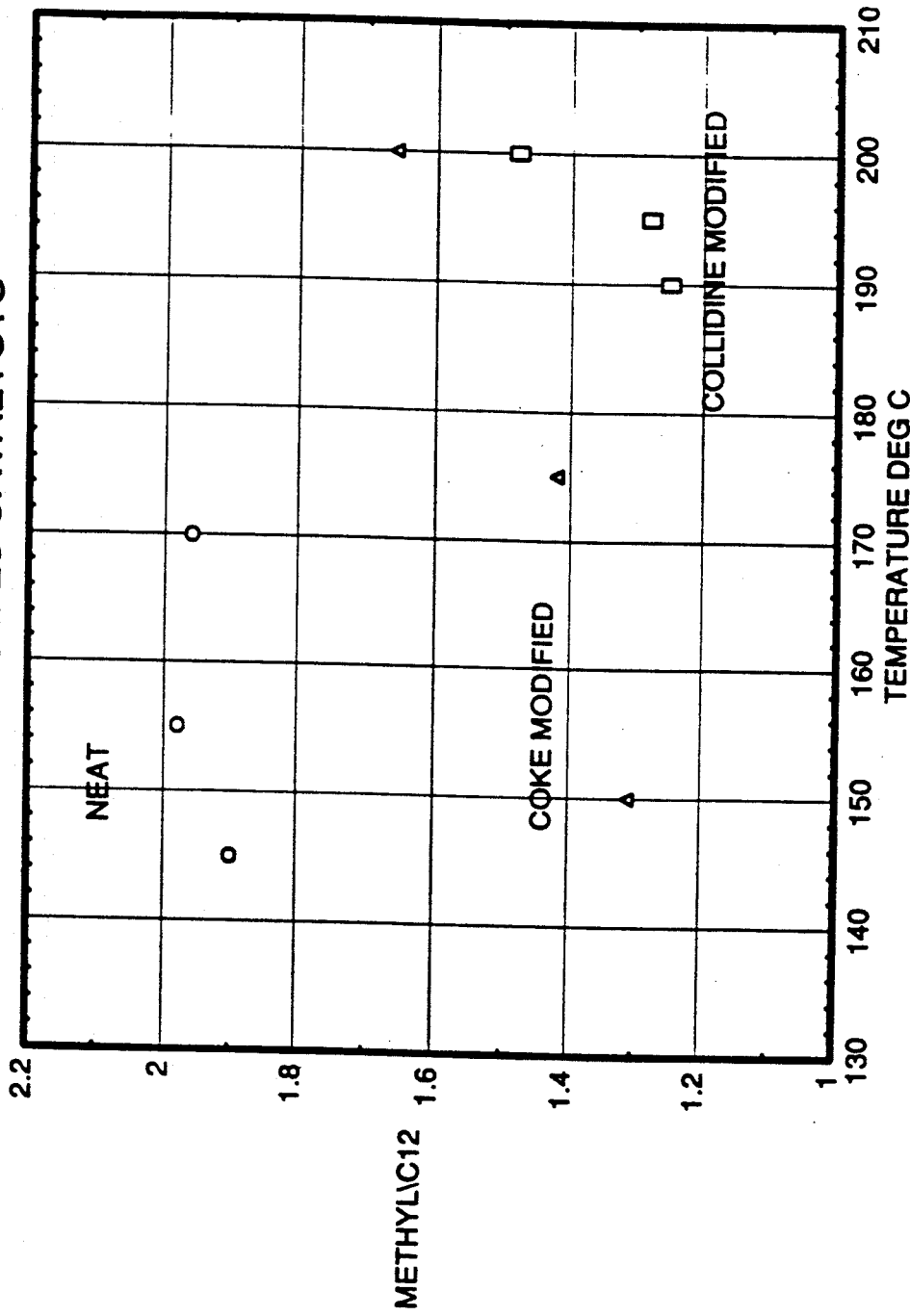

COKE-SELECTIVATED POROUS ACIDIC CRYSTALLINE CATALYST, ITS PREPARATION, AND USE IN OLEFIN OLIGOMERIZATION

BACKGROUND

This application discloses an acidic crystalline catalyst which is surface inactivated by exposure to high pressure coking conditions. The application further discloses uses for such catalyst, including a process for producing high molecular weight hydrocarbons having unexpectedly low methyl branching from a lower olefin feedstock. Such products are useful as distillate fuels, lubricants and chemical intermediates.

Recent work in the field of olefin upgrading has resulted in a catalytic process for converting lower olefins to heavier hydrocarbons. Heavy distillate and lubricant range hydrocarbons can be synthesized over shape-selective catalysts such as ZSM-5 at elevated temperature and pressure to provide a product having substantially linear molecular conformations due to the shape selectivity of certain medium pore catalysts.

Conversion of olefins to gasoline and/or distillate products is disclosed in U.S. Pat. Nos. 3,960,978 and 4,021,502 (Givens, Plank and Rosinski) wherein gaseous olefins in the range of ethylene to pentene, either alone or in admixture with paraffins are converted into an olefinic gasoline blending stock by contacting the olefins with a catalyst bed made up of a ZSM-5 type zeolite. Such a technique has been developed by Garwood, et al, as disclosed in European Patent Application No. 83301391.5, published Sep. 29, 1983. In U.S. Pat. Nos. 4,150,062; 4,211,640; 4,227,992; and 4,547,613 Garwood, et al disclose operating conditions for a process for selective conversion of $C_3^+$ olefins to mainly aliphatic hydrocarbons.

In the process for catalytic conversion of olefins to heavier hydrocarbons by catalytic oligomerization using a medium pore shape selective acid crystalline zeolite, process conditions can be varied to favor the formation of hydrocarbons of varying molecular weight. At moderate temperature and relatively high pressure, the conversion conditions favor $C_{10}^+$ product. Lower olefinic feedstocks containing $C_2-C_8$ alkenes may be converted; however, the distillate mode conditions do not convert a major fraction of ethylene. A typical reactive feedstock consists essentially of $C_3-C_6$ mono-olefins, with varying amounts of non-reactive paraffins and the like being acceptable components. Lower $C_6-C_9$ oligomer products may be recycled.

Shape-selective oligomerization, as it applies to the conversion of $C_2-C_{10}$ olefins over ZSM-5, may produce higher olefins up to $C_{30}$ and higher. As reported by Garwood in "Intrazeolite Chemistry 23", (Amer. Chem. Soc., 1983), reaction conditions favoring higher molecular weight product are low temperature (200°-260° C.), elevated pressure (about 2000 kPa or greater), and long contact time (less than 1 WHSV). The reaction under these conditions proceeds through the acid-catalyzed steps of (1) oligomerization, (2) isomerization-cracking to a mixture of intermediate carbon number olefins, and (3) interpolymerization to give a continuous boiling product containing all carbon numbers. The channel systems of medium pore catalysts impose shape-selective constraints on the configuration of the large molecules, accounting for the differences with other catalysts.

The desired oligomerization-polymerization products include $C_{10}^+$ substantially linear aliphatic hydrocarbons. This catalytic path for propylene feed provides a long chain which generally has lower alkyl (e.g., methyl) substituents along the straight chain.

The final molecular configuration is influenced by the pore structure of the catalyst. For the higher carbon numbers, the structure is primarily a methyl-branched straight olefinic chain, with the maximum cross-section of the chain limited by the dimension of the largest zeolite pore. Although emphasis is placed on the normal 1-alkenes as feedstocks, other lower olefins, such as 2-butene or isobutylene, are readily employed as starting materials due to rapid isomerization over the acidic zeolite catalysts.

The viscosity index of a hydrocarbon lube oil can be related to its molecular configuration. Extensive branching in a molecule usually results in a low viscosity index. Similarly, extensive branching can be problematic in distillate fractions which are utilized as diesel fuels. Such branching increases auto ignition delay beyond that desired for effective operation of diesel engines. Cetane number (CN) is a fuel property which is measured in standard test engines in which the compression ratio is variable (ASTM-D613-65). High CN fuels ignite at low compression ratio relative to accepted standard fuels. It is known that for paraffinic compounds of a given carbon number, the cetane number is highest for the normal paraffin and decreases with increased methyl branching. Cetane number (CN) is a measurable quantity which inversely reflects the extent of branching in the components of a diesel fuel. Minimally branched internal olefins, e.g., $C_{12}^=$, may have utility as decene extenders (chemical intermediates) in synthetic lube oil production.

It is believed that two modes of oligomerization/polymerization of olefins can take place over shape-selective acidic zeolites, such as HZSM-5. One reaction sequence takes place at Brönsted acid sites inside the channels or pores, producing essentially linear materials. The other reaction sequence occurs on the outer surface, producing more branched material. By decreasing the surface acid activity of such zeolites, reduced methyl-branching occurs, resulting in products of higher VI and higher cetane number.

Several techniques may be used to increase the relative ratio of intra-crystalline acid sites to surface active sites in acidic porous crystalline materials. This ratio tends to increase with crystal size due to geometric relationship between volume and external surface area.

It is known to use certain basic materials to deactivate the Brönsted acid sites on the surface of aluminosilicate catalysts. U.S. Pat. No. 4,520,221 and U.S. Pat. No. 4,568,786, Chen, et al., which are expressly incorporated herein disclose bulky amines, such as di-tert-butyl pyridine, as such basic materials. U.S. Pat. No. 4,870,038 to Page et al., incorporated herein by reference, discloses olefin oligomerization using a zeolitic catalyst (ZSM-23) wherein the zeolite surface is rendered substantially inactive for acidic reactions by neutralizing with a bulky pyridine compound, e.g., 2,4,6-collidine. However, these techniques generally require continuous addition of the basic material to the feedstock and operation is limited to lower temperatures in order to avoid loss of the basic material from the catalyst, and low acid activity resulting in the need for operation at low space velocity.

Deposition of carbonaceous materials by coke formation can also shift the effective ratio of intra-crystalline acid sites to surface active sites, as disclosed in U.S. Pat. No. 4,547,613, wherein a zeolite catalyst is conditioned by contact with $C_{2-16}$ olefin at 400° to 1000° F. at 0 to 100 psig for 1-70 hours. The conditioned catalyst provides an oligomerized olefin product having a high viscosity index. Other examples of coke-selectivation of zeolite catalysts are set out in U.S. Pat. Nos. 4,001,346 to Chu et al. and 4,128,592 to Kaeding et al. All of the foregoing references are incorporated herein by reference.

SUMMARY

The present invention relates to a surface-inactivated catalyst composition comprising acidic porous crystalline silicate material having active internal Brönsted acid sites which is surface-inactivated by coking in the presence of olefin at pressures of at least 400 psig. In another aspect, the present invention relates to a process of making a surface-inactivated acidic porous crystalline silicate catalyst which comprises exposing acidic porous crystalline material to coking conditions including the presence of olefin at pressures of at least 400 psig. In yet another aspect, the present invention relates to a process for effecting oligomerization of of an olefin-containing feed which comprises contacting the feed under catalytic conversion conditions with a catalytically effective amount of surface-inactivated catalyst composition comprising acidic porous crystalline material having active internal Brönsted acid sites which has been surface-inactivated by exposure to coking conditions including pressures of at least 400 psig.

In another aspect of the invention, surface-inactivated, but internally active, shape-selective, metallosilicate zeolite catalyst, e.g., ZSM-23, is employed in olefin oligomerization, to provide a high quality, essentially linear oligomer stock which can be efficiently converted to high VI lube oils, high octane diesel fuel and/or valuable chemical intermediates. The catalyst is surface inactivated by coking under conditions which include pressures of at least 400 psig.

BRIEF DESCRIPTION OF THE DRAWING

The Figure depicts methyl branching per $C_{12}$ hydrocarbon versus temperature requirement for unmodified, collidine-modified and coke-modified ZSM-23 catalysts.

DETAILED DESCRIPTION OF THE INVENTION

The acidic porous crystalline silicate materials which are used in preparing the surface-modified materials of the present invention can be a porous crystalline silicate, e.g., a shape selective porous crystalline silicate zeolite. Any zeolite having a Constraint Index of 1-12 can be used herein. Preferred shape selective zeolites are exemplified by ZSM-5, ZSM-11, ZSM-12, ZSM-22, ZSM-23, ZSM-35, and ZSM48 and similar materials.

The members of the class of zeolites useful herein have an effective pore size of generally from about 5 to about 8 angstroms, such as to freely sorb normal hexane. In addition, the structures provide constrained access to larger molecules. It is sometimes possible to judge from a known crystal structure whether such constrained access exists. For example, if the only pore windows in a crystal are formed by 8-membered rings of silicon and aluminum atoms, then access by molecules of larger cross-section than normal hexane is excluded and the zeolite is not of the desired type. Windows of 10-membered rings are preferred, although, in some instances, excessive puckering of the rings or pore blockage may render these zeolite ineffective.

Although 12-membered rings in theory would not offer sufficient constraint to produce advantageous conversions, it is noted that the puckered 12-ring structure of TMA offretite does show some constrained access. Other 12-ring structures may exist which may be operative for other reasons, and therefore, it is not the present intention to entirely judge the usefulness of the particular zeolite solely from theoretical structural considerations.

A convenient measure of the extent to which a zeolite provides control to molecules of varying sizes to its internal structure is the Constraint Index of the zeolite. Zeolites which provide a highly restricted access to and egress from its internal structure have a high value for the Constraint Index, and zeolites of this kind usually have pores of small size, e.g. less than 5 angstroms. On the other hand, zeolites which provide relatively free access to the internal zeolite structure have a low value for the Constraint Index, and usually pores of large size, e.g. greater than 8 angstroms. The method by which Constraint Index is determined is described fully in U.S. Pat. No. 4,016,218, incorporated herein by reference for details of the method.

Constraint Index (CI) values for some typical materials are:

|  | CI | (at test temperature) |
|---|---|---|
| ZSM-4 | 0.5 | (316° C.) |
| ZSM-5 | 6-8.3 | (371° C.-316° C.) |
| ZSM-11 | 5-8.7 | (371° C.-316° C.) |
| ZSM-12 | 2.3 | (316° C.) |
| ZSM-20 | 0.5 | (371° C.) |
| ZSM-22 | 7.3 | (427° C.) |
| ZSM-23 | 9.1 | (427° C.) |
| ZSM-34 | 50 | (371° C.) |
| ZSM-35 | 4.5 | (454° C.) |
| ZSM-38 | 2 | (510° C.) |
| ZSM-48 | 3.5 | (538° C.) |
| ZSM-50 | 2.1 | (427° C.) |
| TMA Offretite | 3.7 | (316° C.) |
| TEA Mordenite | 0.4 | (316° C.) |
| Clinoptilolite | 3.4 | (510° C.) |
| Mordenite | 0.5 | (316° C.) |
| REY | 0.4 | (316° C.) |
| Amorphous Silica-alumina | 0.6 | (538° C.) |
| Dealuminized Y | 0.5 | (510° C.) |
| Erionite | 38 | (316° C.) |
| Zeolite Beta | 0.6-2.0 | (316° C.-399° C.) |

The above-described Constraint Index provides a definition of those zeolites which are useful in the instant invention. The very nature of this parameter and the recited technique by which it is determined, however, admit of the possibility that given a zeolite can be tested under somewhat different conditions and thereby exhibit different Constraint Indices. Constraint Index seems to vary somewhat with severity of operations (conversion) and the presence or absence of binders. Likewise, other variables, such as crystal size of the zeolite, the presence of occluded contaminants, etc., may affect the Constraint Index. Therefore, it will be appreciated that it may be possible to so select test conditions, e.g. temperature, as to establish more than one value for the Constraint Index of a particular zeolite.

This explains the range of Constraint Indices for some zeolites, such as ZSM-5, ZSM-11 and Beta.

It is to be realized that the above CI values typically characterize the specified zeolites, but that such are the cumulative result of several variables useful in the determination and calculation thereof. Thus, for a given zeolite exhibiting a CI value within the range of 1 to 12, depending on the temperature employed during the test method within the range of 290° C. to about 538° C., with accompanying conversion between 10% and 60%, the CI may vary within the indicated range of 1 to 12. Likewise, other variables such as the crystal size of the zeolite, the presence of possibly occluded contaminants and binders intimately combined with the zeolite may affect the CI. It will accordingly be understood to those skilled in the art that the CI, as utilized herein, while affording a highly useful means for characterizing the zeolites of interest is approximate, taking into consideration the manner of its determination, with the possibility, in some instances, of compounding variable extremes. However, in all instances, at a temperature within the above-specified range of 290° C. to about 538° C., the CI will have a value for any given zeolite of interest herein within the approximate range of 1 to 12.

Examples of zeolites having a Constraint Index of from 1 to 12 include ZSM-5, ZSM-11, ZSM-12, ZSM-22, ZSM-23, ZSM-35, ZSM-38 and ZSM-48.

ZSM-5 is described in U.S. Pat. No. 3,702,886, U.S. Pat. No. Reissue 29,948 and in U.S. Pat. No. 4,061,724 (describing a high silica ZSM-5 as "silicalite").

ZSM-11 is described in U.S. 3,709,979.

ZSM-12 is described in U.S. 3,832,449.

ZSM-22 is described in U.S. 4,556,477.

ZSM-23 is described in U.S. 4,076,842.

ZSM-35 is described in U.S. 4,016,245.

ZSM-48 is described in U.S. 4,397,827.

These patents are incorporated herein by reference.

Zeolites in which some other framework element is present in partial or total substitution of aluminum can be advantageous. Elements which can be substituted for part or all of the framework aluminum are boron, gallium, zirconium, titanium and trivalent metals which are heavier than aluminum. In lieu of, or in addition to, being incorporated into the zeolite framework, these and other catalytically active elements can also be deposited upon the zeolite by any suitable procedure, e.g., impregnation.

It is generally desirable to incorporate the acidic porous crystalline material with another material resistant to the temperatures and other conditions employed in organic conversion processes. Such matrix materials include active and inactive materials and synthetic or naturally occurring zeolites as well as inorganic materials such as clays, silica and/or metal oxides. The latter may be either naturally occurring or in the form of gelatinous precipitates, sols or gels including mixtures of silica and metal oxides. Use of a material in conjunction with the acidic porous crystalline material, i.e. combined therewith, which is active, tends to improve the conversion and/or selectivity of the catalyst in certain organic conversion processes. Inactive materials suitably serve as diluents to control the amount of conversion and/or selectivity of the catalyst in certain organic conversion processes. Inactive materials suitably serve as diluents to control the amount of conversion in a given process so that products can be obtained without employing other means for controlling the rate of reaction. Frequently, zeolite materials have been incorporated into naturally occurring clays, e.g. bentonite and kaolin. These materials, i.e. clays oxides, etc., function, in part, as binders for the catalyst. It is desirable to provide a catalyst having good crush strength, because in a petroleum refinery the catalyst is often subjected to rough handling, which tends to break the catalyst down into powder-like materials which cause problems in processing.

Naturally occurring clays which can be composited with the acidic porous crystalline material include the montmorillonite and kaolin family, which families include the sub-bentonites, and the kaolins commonly known as Dixie, McNamee, Georgia and Florida clays or others in which the main mineral constituents is halloysite, kaolinite, dickite, nacrite, or anauxite. Such clays can be used in the raw state as originally mined or initially subjected to calcination, acid treatment or chemical modification.

In addition to the foregoing materials the acidic porous crystalline material catalyst can be composited with a porous matrix material such as alumina, silica, silica-alumina, silica-magnesia, silica-zirconia, silica-thoria, silica-beryllia, silica-titania as well as ternary compositions such as silica-alumina-thoria, silica-alumina-zirconia, silica-alumina-magnesia and silica-magnesia-zirconia. The matrix can be in the form of a cogel. A mixture of these components could also be used.

The relative proportions of acidic porous crystalline silicate material, and inorganic oxide gel matrix vary widely with the acidic porous crystalline material content ranging from about 1 to about 90 percent by weight and more usually in the range of about 2 to about 50 percent by weight of the composite.

The shape-selective oligomerization/polymerization catalysts preferred for use herein include the crystalline aluminosilicate zeolites having a silica-to-alumina molar ratio of at least 12, a constraint index of about 1 to 12, preferably about 7 to 10, and acid cracking activity (alpha value) of about 10–300. A suitable shape selective medium pore catalyst for fixed bed is a small crystal H-ZSM-23 zeolite having alpha value of about 25, with alumina binder in the form of cylindrical extrudates of about 1–5 mm. The preferred catalyst consists essentially of ZSM-23 having a crystallite size of about 0.02 to 2 microns, with framework metal synthesized as gallo-silicate, ferrosilicate, and/or aluminosilicate. These zeolites have a pore size of 4.5×5.6 Angstroms, such as to freely sorb normal hexane. In addition, the structure must provide constrained access to larger molecules.

It is generally understood that the proportion of internal acid sites relative to external acid sites increases with larger crystal size. However, the smaller crystallites, usually less than 0.1 micron, are preferred for diffusion-controlled reactions, such as oligomerization, polymerization, etc. Accordingly, it may be required to neutralize more than 15% of the total Brönsted acid sites by coking.

The acidic porous crystalline material of the present invention can be prepared by contacting the above-described acidic porous crystalline materials, preferably composited with a porous matrix material, e.g., alumina, with a thermally decomposable organic compound, e.g., ethylene, at a temperature in excess of the decomposition temperature of said compound and at a pressure of at least 400 psig, e.g., 400 to 1100 psig, preferably 500 to 900 psig, e.g., 750 to 850 psig. The catalyst is usually exposed to the above coking conditions for a period of 0.1 to 14 days, preferably 12 to 48 hours prior to its use in organic compound conversion. The coking temperatures can range from 200° to 500° C., preferably 250° to 400° C., say 325° to 375° C. Generally, higher coking temperatures within these ranges are preferred, along with lower olefins as the source of coke which require higher coking temperatures, e.g. ethylene or propylene, in order to lay down a harder coke.

Optionally, the zeolite can be subjected to thermal treatment prior to coking, including steaming or calcination in air, hydrogen or an inert gas, e.g., nitrogen or helium.

An especially useful modifying treatment entails steaming of the zeolite by contact with an atmosphere containing from about 5 to 100 percent steam at a temperature of from about 250° to 1000° C.

Organic materials, thermally decomposable under the above temperature conditions to provide coke depositions, encompass a wide variety of compounds including by way of example, hydrocarbons, such as paraffinic, cycloparaffinic, cycloolefinic and aromatic; oxygen-containing organic compounds such as alcohols, aldehydes, ethers, ketones and phenols; and heterocyclics such as furans, thiophenes, pyrroles and pyridines. Usually, it is contemplated that a thermally decomposable hydrocarbon, such as a lower olefin, e.g. $C_2$ to $C_6$, alone or admixed with a lower paraffinic hydrocarbon, e.g., $C_2$ to $C_6$, will be the source of coke. Ethylene or propylene is particularly desirable. Lower olefins are preferable to higher olefins as a source of coke inasmuch as they require higher temperatures to produce coking and thus render a harder, more durable coke on the catalyst surface. The thermally decomposable organic material may also be combined with 1 to 90 mol % of an inert gaseous material, e.g., nitrogen or helium. A particularly suitable feed comprises a mixture of 30 mol % organic, e.g., ethylene and 70 mol % inert diluent, e.g., nitrogen.

In one embodiment of the invention, the coke is baked after being laid down on the zeolite to further enhance the stability and durability of the coked catalyst. This can be achieved by ceasing or limiting the flow of the decomposable organic compound over the zeolite while maintaining the catalyst at the temperatures employed during the coking process for a period of time sufficient to provide a harder coke, e.g., 1 to 96 hours, preferably 12 to 48 hours.

The catalyst composition of the present invention is useful as a catalyst component for a variety of organic, e.g., hydrocarbon, compound conversion processes. Such conversion processes include, as non-limiting examples, cracking hydrocarbons with reaction conditions including a temperature of from 300° C. to 700° C., a pressure of from 0.1 atmosphere (bar) to about 30 atmospheres and a weight hourly space velocity of from 0.1 $hr^{-1}$ to 20 $hr^{-1}$; dehydrogenating hydrocarbon compounds with reaction conditions including a temperature of from 300° C. to 700° C., a pressure of from 0.1 atmosphere (bar) to 10 atmospheres and a weight hourly space velocity of from 0.1 $hr^{-1}$ to 20 $hr^{-1}$; converting paraffins to aromatics with reaction conditions including a temperature of from 100° C. to 700° C., a pressure of from 0.1 atmosphere (bar) to 60 atmospheres and a weight hourly space velocity of from 0.5 $hr^{-1}$ to 400 $hr^{-1}$ and a hydrogen/hydrocarbon mole ratio of from 0 to 20; converting olefins to aromatics, e.g., benzene, toluene and xylenes, with reaction conditions including a temperature of from 100° C. to 700° C., a pressure of from 0.1 atmosphere (bar) to 60 atmospheres and a weight hourly space velocity of from 0.5 $hr^{-1}$ to 400 $hr^{-1}$ and a hydrogen/hydrocarbon mole ratio of from 0 to 20; converting alcohols, e.g., methanol, or ethers, e.g., dimethylether, or mixtures thereof to hydrocarbons including aromatics with reaction conditions including a temperature of from 300° C. to 550° C., more preferably from 370° C. to 500° C., a pressure of from 0.01 to 2000 psi, more preferably from 0.1 to 500 psi and a liquid hourly space velocity of from 0.5 $hr^{-1}$ to 100 $hr^{-1}$; isomerizing xylene feedstock components with reaction conditions including a temperature of from 230° C. to 510° C., a pressure of from 3 atmospheres to 35 atmospheres, a weight hourly space velocity of from 0.1 to 200 and a hydrogen/hydrocarbon mole ratio of from 0 to 100; disproportionating toluene with reaction conditions including a temperature of from 200° C. to 760° C., a pressure of from atmospheric to 60 atmospheres, and a weight hourly space velocity of from 0.08 to 20; alkylating aromatic hydrocarbons, e.g. benzene and alkylbenzenes, in the presence of an alkylating agent, e.g. olefins, formaldehyde, alkyl halides and alcohols, with reaction conditions including a temperature of from 340° C. to 500° C., a pressure of from atmospheric to 200 atmospheres, a weight hourly space velocity of from 2 to 2000 and an aromatic hydrocarbon/alkylating agent mole ratio of from 1/1 to 20/1; and transalkylating aromatic hydrocarbons in the presence of polyalkylaromatic hydrocarbons with reaction conditions including a temperature of from 340° C. to 500° C., a pressure of from atmospheric to 200 atmospheres, a weight hourly space velocity of from 10 to 1000 and an aromatic hydrocarbon/alkylating agent mole ratio of from 1/1 to 6/1;

In a particularly preferred embodiment, the catalyst of the present invention is employed in the oligomerization of olefins to distillates and lubes. Such products are characterized by reduced methyl-branching of paraffinic components which is reflected in enhanced cetane number for distillates and enhanced viscosity index for lubricants. In addition, the use of such catalyst can minimize the amount of higher molecular weight oligomers (650° F.+) produced. Conversion of olefins to gasoline and/or distillate products is disclosed in U.S. Pat. Nos. 3,960,978 and 4,021,502 (Givens, Plank and Rosinski) wherein gaseous olefins in the range of ethylene to pentene, either alone or in admixture with paraffins are converted into an olefinic gasoline blending stock by contacting the olefins with a catalyst bed made up of a ZSM-5 type zeolite. Such a technique has been developed by Garwood, et al, as disclosed in European Patent Application No. 83301391.5, published Sep. 29, 1983. In U.S. Pat. Nos. 4,150,062; 4,211,640; 4,227,992; and 4,547,613 Garwood, et al disclose operating conditions for a process for selective conversion of $C_3+$ olefins to mainly aliphatic hydrocarbons. All of these disclosures, particularly those parts relating to conversion conditions, are incorporated herein by reference.

Suitable feeds for this oligomerization method are lower olefinic feedstocks, e.g., those containing $C_2$ to $C_8$ alkenes. $C_3$ to $C_6$ mono-olefins are particularly suitable and may contain varying amounts of nonreactive paraffins, e.g., propane. A typical feed comprises 60 mol % propylene and 40 mol % propane.

Particular oligomerization conditions suited for the present invention include temperatures of 100° to 300° C., preferably 150° to 250° C., pressures of 600 to 1200 psig, preferably 800 to 1100 psig, at a weight hourly space velocity of 0.2 to 5, preferably 0.5 to 2 hr$^{-1}$. Generally, conditions are maintained which result in at least 50 wt % conversion of the lower olefinic feedstock to $C_{12}$ or higher ($C_{12}+$) product, preferably at least 75 wt %. Generally conditions are maintained to provide a distillate product boiling below 700° F. (370° C.) with recycling of lower $C_{12}^-$ oligomers. Hydrogenation of the diesel product may be necessary.

In the process for catalytic conversion of olefins to heavier hydrocarbons by catalytic oligomerization using a medium pore shape selective acid crystalline zeolite, process conditions can be varied to favor the formation of hydrocarbons of varying molecular weight. At moderate temperature and relatively high pressure, the conversion conditions favor $C_{10}^+$ aliphatic product. Lower olefinic feedstocks containing $C_2$–$C_8$ alkenes may be converted; however, the distillate mode conditions do not convert a major fraction of ethylene. A typical reactive feedstock consists essentially of $C_3$–$C_6$ mono-olefins, with varying amounts of non-reactive paraffins and the like being acceptable components.

When olefins, e.g., propylene or butene, are oligomerized according to processes described herein, a mixture of liquid hydrocarbon products are formed. More particularly, this mixture of hydrocarbons may comprise at least 95% by weight of mono-olefin oligomers of the empirical formula $$C_{(n+nm)}H_{2(n+nm)}$$

where n is 3 or 4 and m is an integer from 1 to 6, said mono-olefin oligomers comprising at least 20 percent by weight of olefins having at least 12 carbon atoms, said olefins having at least 12 carbon atoms having an average of from 0.80 to 2.00 methyl side groups per carbon chain, said olefins not having any side groups other than methyl.

It will be understood that methyl side groups are methyl groups which occupy positions other than the terminal positions of the first and last (i.e., alpha and omega) carbon atoms of the longest carbon chain. This longest carbon chain is also referred to herein as the straight backbone chain of the olefin. The average number of methyl side groups for the $C_{12}^+$ olefins may comprise any range within the range of 0.80 to 2.00, e.g., from 0.80 to 1.90, e.g., from 0.80 to 1.80, e.g. from 0.80 to 1.70, e.g., from 0.80 to 1.60, e.g., from 0.80 to 1.50, e.g., from 0.80 to 1.40, e.g., from 0.80 to 1.30, etc.

These oligomers ma be separated into fractions by conventional distillation separation. When propylene is oligomerized, olefin fractions containing the following numbers of carbon atoms can be obtained: 6, 9, 12, 15, 18 and 21. When butene is oligomerized, olefin fractions containing the following numbers of carbon atoms may be obtained: 8, 12, 16, 20, 24 and 28. It is also possible to oligomerize a mixture of propylene and butene and to obtain a mixture of oligomers having at least 6 carbon atoms.

By fractionating a oligomerization product prepared by processes described herein, one may obtain a mixture of hydrocarbons, said hydrocarbons comprising at least 95 (e.g., at least 98) percent by weight of mono-olefins having 12 carbon atoms, said mono-olefins having a straight backbone chain of at least 10 carbon atoms, said mono-olefins having an average of from 0.40 to 2.00 (e.g., from 1.30 to 1.70, e.g., from 0.50 to 1.90, e.g., from 0.60 to 1.80, e.g., from 0.70 to 1.70, e.g., from 0.80 to 1.60, e.g., from 0.80 to 1.50, e.g., from 0.80 to 1.40, e.g., from 0.80 to 1.30) methyl side groups per carbon chain. These $C_{12}$ olefins may comprise or consist essentially of at least 5 (e.g., from 5 to 40, e.g., from 5 to 25) mole percent dodecene (i.e., a $C_{12}$ olefin having no methyl side groups) at least 30 (e.g., from 30 to 90, e.g., from 65 to 80) mole percent methylundecene (i.e., a $C_{12}$ olefin having one methyl side group) and at least 5 (e.g., from 5 to 40, e.g., from 5 to 25) mole percent dimethyldecene (i.e., a $C_{12}$ olefin having two methyl side groups).

By the present process, lower value feedstocks such as propylene can be oligomerized to higher value products such as linear $C_{12}$ olefins which can be used as decene extenders in synthetic alpha-olefin polymer lubricant base stocks. The oligomerization of the present invention can also be used to convert feedstocks such as propylene to high cetane distillates, which can be used as diesel fuels upon hydrogenation.

EXAMPLE 1: PREPARATION OF COKE-SELECTIVATED ZSM-23 CATALYST

Coke-selectivated ZSM-23 was prepared from a ZSM-23 base catalyst which was extruded with $Al_2O_3$ in a 65/35 wt % zeolite/binder ratio and converted to the $H^+$ form by ammonium exchange and calcination. The catalyst was then steamed at 482° C. for 4 hours to further activate the zeolite. The steamed base catalyst was then coke-selectivated by processing a 30 mol % ethylene in $N_2$ feed at 350° C. and 800 psig for about 1 day in a continuous flow micro-reactor on a single pass basis. In a typical run, 6.2 g of catalyst were sized to 20/40 mesh, mixed with 5 g of 20/40 mesh sand and loaded into a 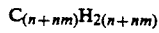" overall diameter reactor.

EXAMPLE 2: OLIGOMERIZATION OF PROPYLENE WITH COKE-SELECTIVATED ZSM-23 CATALYST

After preparing the coke-selectivated catalyst of Example 1, unit pressure was increased to 1000 psig and a 60/40 mol % propylene/propane feed was run three times (Runs 1 to 3). Products were analyzed by gas-chromatography. Operating conditions and the data obtained are set out below in Table 1. The relationship between methyl branching per $C_{12}$ hydrocarbon and temperature is set out in the Figure. The methyl branching number is indicative of the degree of branching observed in the products and more desired linear products are obtained at lower branching numbers.

EXAMPLE 3: OLIGOMERIZATION OF PROPYLENE WITH BASE ZSM-23 CATALYST (COMPARATIVE)

6.2 g of the steamed base ZSM-23 catalyst of Example 1, were sized to 20/40 mesh, mixed with 5 g of 20/40 mesh sand and loaded into a ⅜" overall diameter reactor. Unit pressure was increased to 1000 psig and a 60/40 mol % propylene/propane feed was run three times (Runs 4 to 6). Products were analyzed by gas-chromatography. Operating conditions and the data obtained are set out below in Table 2. The relationship between methyl branching per $C_{12}$ hydrocarbon and temperature is set out in the Figure.

EXAMPLE 4: OLIGOMERIZATION OF PROPYLENE WITH COLLIDINE-MODIFIED ZSM-23 CATALYST (COMPARATIVE)

7.7 g of the steamed base ZSM-23 catalyst of Example 1, were impregnated with 0.045 g of collidine dissolved in pentane. The mixture was stirred and the pentane allowed to evaporate. The resulting product was sized to 20/40 mesh, and mixed with 5 g of 20/40 mesh sand and loaded into a ⅜" overall diameter reactor. Unit pressure was increased to 1000 psig and a 60/40 mol % propylene/propane feed was run three times (Runs 7 to 9). Products were analyzed by gas-chromatography. Operating conditions and the data obtained are set out below in Table 3 The relationship between methyl branching per $C_{12}$ hydrocarbon and temperature is set out in the Figure.

The Figure shows that modified ZSM-23 catalysts give lower branched products as a function of temperature than the base unmodified catalyst. The data from Tables 1 and 3 indicate reasonably similar selectivity for $C_{10+}$ products for the modified catalysts to ($C_6$ to $C_9$ products may be recycled) at similar $C_{12}$ methyl branching. However, the coke-selectivated ZSM-23 produced this selectivity at about 2 to 5 times the WHSV of the collidine-modified samples.

EXAMPLE 5: OLIGOMERIZATION OF PROPYLENE WITH LOW PRESSURE COKE-SELECTIVATED ZSM-23 CATALYST (COMPARATIVE)

Coke-selectivated ZSM-23 was prepared from a ZSM-23 base catalyst which was extruded with $Al_2O_3$ in a 65/35 wt % zeolite/binder ratio and converted to the H+ form by ammonium exchange and calcination. The catalyst was then steamed at 482° C. for 4 hours to further activate the zeolite. The steamed base catalyst was then coke-selectivated by processing a 30 mol % ethylene in $N_2$ feed at 350° C. and 100 psig for about 1 day in a continuous flow micro-reactor on a single pass basis. In a typical run, 6.2 g of catalyst were sized to 20/40 mesh, mixed with 5 g of 20/40 mesh sand and loaded into a ⅜" overall diameter reactor.

After preparing the low-pressure coke-selectivated catalyst, unit pressure was increased to 1000 psig and a 60/40 mol % propylene/propane feed was run two times (Runs 10 and 11). Products were analyzed by gas-chromatography. Operating conditions and the data obtained are set out below in Table 4, which, for comparative purposes, also contains the data obtained from Run 3.

At constant 90% propylene conversion and 1.0 WHSV, the product of high-pressure coke-selectivation of the present invention shows much lower methyl branching per $C_{12}$ over Run 11 (1.7 vs. 2.5, respectively). Even lowered space velocities and consequently lower temperatures (Run 10) did not improve the methyl branching of the product prepared from low-pressure coke-selectivated catalyst.

TABLE 1

| | RUN NUMBER | | |
|---|---|---|---|
| | 1 | 2 | 3 |
| TYPE FEED | $C_3H_6/C_3H_8$ | $C_3H_6/C_3H_8$ | $C_3H_6/C_3H_8$ |
| TYPE CATALYST | STEAMED ZSM-23/$Al_2O_3$ COKE SELECTIVATED | STEAMED ZSM-23/$Al_2O_3$ COKE SELECTIVATED | STEAMED ZSM-23/$Al_2O_3$ COKE SELECTIVATED |
| REACTION TEMP, °C. | 150 | 175 | 200 |
| PRESSURE, PSIG | 1000 | 1000 | 1000 |
| W.H.S.V. (ZEOLITE) | 1.09 | 1.08 | 1.03 |
| LIQUID ANALYSIS, WEIGHT % | | | |
| $C_4$–$C_7$ | 25.92 | 45.86 | 36.74 |
| $C_7$–$C_{10}$ | 62.18 | 37.87 | 34.27 |
| $C_{10}$–$C_{13}$ | 6.02 | 8.05 | 14.69 |
| $C_{13}$–$C_{16}$ | 2.60 | 3.79 | 7.23 |
| $C_{16}$–$C_{19}$ | 1.27 | 1.54 | 3.84 |
| $C_{19}$–$C_{22}$ | 1.12 | 0.89 | 1.33 |
| $C_{22}$–$C_{25}$ | 0.31 | 1.15 | 0.72 |
| $C_{24}+$ | 0.58 | 0.85 | 1.18 |
| PROPYLENE CONVERSION, WEIGHT % | 22.06 | 50.23 | 89.78 |
| METHYLS/$C_{12}$ | 1.31 | 1.42 | 1.66 |

TABLE 2

| | RUN NUMBER | | |
|---|---|---|---|
| | 4 | 5 | 6 |
| TYPE FEED | $C_3H_6/C_3H_8$ | $C_3H_6/C_3H_8$ | $C_3H_6/C_3H_8$ |
| TYPE CATALYST | STEAMED ZSM-23/$Al_2O_3$ | STEAMED ZSM-23/$Al_2O_3$ | STEAMED ZSM-23/$Al_2O_3$ |
| REACTION TEMP, °C. | 145 | 155 | 170 |
| PRESSURE, PSIG | 1000 | 1000 | 1000 |
| W.H.S.V. | 0.19 | 0.20 | 0.48 |

TABLE 2-continued

| | RUN NUMBER | | |
|---|---|---|---|
| | 4 | 5 | 6 |
| (ZEOLITE) | | | |
| LIQUID ANALYSIS, WEIGHT % | | | |
| $C_4$-$C_7$ | 14.28 | 11.28 | 13.18 |
| $C_7$-$C_{10}$ | 53.73 | 45.70 | 44.74 |
| $C_{10}$-$C_{13}$ | 17.18 | 20.12 | 20.08 |
| $C_{13}$-$C_{16}$ | 7.57 | 11.64 | 11.27 |
| $C_{16}$-$C_{19}$ | 3.54 | 5.58 | 6.01 |
| $C_{19}$-$C_{22}$ | 1.78 | 2.83 | 2.67 |
| $C_{22}$-$C_{25}$ | 0.89 | 1.38 | 1.12 |
| $C_{24}+$ | 1.04 | 1.48 | 0.93 |
| PROPYLENE CONVERSION, WEIGHT % | 57.38 | 83.03 | 77.34 |
| METHYLS/$C_{12}$ | 1.90 | 1.98 | 1.96 |

TABLE 3

| | RUN NUMBER | | |
|---|---|---|---|
| | 7 | 8 | 9 |
| TYPE FEED | $C_3H_6$/$C_3H_8$ | $C_3H_6$/$C_3H_8$ | $C_3H_6$/$C_3H_8$ |
| TYPE CATALYST | STEAMED ZSM-23/$Al_2O_3$ COLLIDINE MODIFIED | STEAMED ZSM-23/$Al_2O_3$ COLLIDINE MODIFIED | STEAMED ZSM-23/$Al_2O_3$ COLLIDINE MODIFIED |
| REACTION TEMP, °C. | 190 | 195 | 200 |
| PRESSURE, PSIG | 1000 | 1000 | 1000 |
| W.H.S.V. (ZEOLITE) | 0.19 | 0.38 | 0.19 |
| LIQUID ANALYSIS, WEIGHT % | | | |
| $C_4$-$C_7$ | 53.56 | 53.68 | 37.83 |
| $C_7$-$C_{10}$ | 26.04 | 27.27 | 25.20 |
| $C_{10}$-$C_{13}$ | 10.15 | 7.79 | 15.40 |
| $C_{13}$-$C_{16}$ | 6.63 | 5.43 | 10.42 |
| $C_{16}$-$C_{19}$ | 1.64 | 1.60 | 5.41 |
| $C_{19}$-$C_{22}$ | 0.97 | 1.96 | 1.53 |
| $C_{22}$-$C_{25}$ | 0.78 | 1.08 | 2.16 |
| $C_{24}+$ | 0.23 | 1.18 | 2.05 |
| PROPYLENE CONVERSION, WEIGHT % | 84.57 | 77.38 | 96.21 |
| METHYLS/$C_{12}$ | 1.25 | 1.28 | 1.48 |

TABLE 4

| | RUN NUMBER | | |
|---|---|---|---|
| | 3 | 10 | 11 |
| HOURS AT CONDITION | 15.00 | 16.00 | 23.00 |
| TYPE FEED | $C_3H_6$/$C_3H_8$ | $C_3H_6$/$C_3H_8$ | $C_3H_6$/$C_3H_8$ |
| TYPE CATALYST | ZSM-23 | ZSM-23 | ZSM-23 |
| BINDER TYPE | 35 WT $Al_2O_3$ | 35 WT $Al_2O_3$ | 35 WT $Al_2O_3$ |
| CATALYST TREATMENT | COKE SELECTIVATED | COKE SELECTIVATED | COKE SELECTIVATED |
| GMS CATALYST LOADED | 4.00 | 4.00 | 4.00 |
| REACTION TEMP, °C. | 200 | 160 | 175 |
| PRESSURE, PSIG | 1000 | 1000 | 1000 |
| W.H.S.V. | 1.039 | 0.50 | 1.01 |
| COMBINED PRODUCT ANALYSIS, WEIGHT % | | | |
| $C_4$-$C_7$ | 36.74 | 28.24 | 29.11 |
| $C_7$-$C_{10}$ | 34.27 | 45.96 | 44.67 |
| $C_{10}$-$C_{13}$ | 14.69 | 16.87 | 16.66 |
| $C_{13}$-$C_{16}$ | 7.23 | 5.69 | 6.22 |
| $C_{16}$-$C_{19}$ | 3.84 | 1.82 | 2.07 |
| $C_{19}$-$C_{22}$ | 1.33 | 0.60 | 0.66 |
| $C_{22}$-$C_{25}$ | 0.72 | 0.51 | 0.44 |
| $C_{24}+$ | 1.18 | 0.32 | 0.16 |
| PROPYLENE CONVERSION, WEIGHT % | 89.78 | 91.95 | 89.67 |
| METHYL BRANCHING METHYLS/$C_{12}$ | 1.66 | 2.50 | 2.50 |

It is claimed:

1. A surface-inactivated catalyst composition comprising acidic porous crystalline silicate material having active internal Brönsted acid sites which is steamed and then surface-inactivated by coking in the presence of olefin at pressures of at least 400 psig.

2. The catalyst composition of claim 1 wherein said porous crystalline silicate has a $SiO_2/Al_2O_3$ molar ratio of at least 12, a constraint index of 1 to 12, said composition comprises 2 to 50 weight percent of inorganic oxide matrix, said composition being steamed at a temperature ranging from 250° to 1000° C. prior to said coking, wherein said coking is carried out at pressures ranging from 400 to 1100 psig in the presence of $C_2$ to $C_6$ olefin for a period of time ranging from 0.1 to 14 days.

3. The catalyst composition of claim 2 wherein said porous crystalline silicate has a constraint index of 7 to 10, said inorganic matrix comprises alumina, said pressures range from 500 to 900 psig, and said olefin is selected from the group consisting of ethylene and propene.

4. The catalyst composition of claim 1 wherein said porous crystalline silicate has the structure of ZSM-23.

5. The catalyst composition of claim 3 wherein said porous crystalline silicate has the structure of ZSM-23.

6. A process of making a surface-inactivated acidic porous crystalline silicate catalyst composition selective for producing substantially linear hydrocarbons during oligomerization of lower olefins which comprises coking said acidic porous crystalline silicate in the presence of olefin at pressures of at least 400 psig.

7. The process of claim 6 wherein said porous crystalline silicate has a $SiO_2/Al_2O_3$ molar ratio of at least 12, a constraint index of 1 to 12, said composition comprises 2 to 50 weight percent of inorganic oxide matrix, said composition being steamed at a temperature ranging from 250° to 1000° C. prior to said coking, and said coking is carried out at pressures ranging from 400 to 1100 psig in the presence of $C_2$ to $C_6$ olefin for a period of time ranging from 12 to 48 hours.

8. The process of claim 7 wherein said porous crystalline silicate has a constraint index of 7 to 10, said inorganic matrix comprises alumina, said pressures range from 500 to 900 psig, and said olefin is selected from the group consisting of ethylene and propene.

9. The process of claim 6 wherein said porous crystalline silicate has the structure of ZSM-23.

10. The process of claim 8 wherein said porous crystalline silicate has the structure of ZSM-23.

* * * * *